United States Patent
Namgoong et al.

(10) Patent No.: US 9,648,504 B2
(45) Date of Patent: May 9, 2017

(54) USING SUBARRAYS OF A BEAMFORMER FOR TRANSMISSIONS IN A FORWARD LINK

(71) Applicant: QUALCOMM Incorporated, San Diego, CA (US)

(72) Inventors: June Namgoong, San Diego, CA (US); Srikant Jayaraman, San Diego, CA (US); Ruoheng Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 14/101,919

(22) Filed: Dec. 10, 2013

(65) Prior Publication Data

US 2015/0163683 A1 Jun. 11, 2015

(51) Int. Cl.
*H04W 16/28* (2009.01)
*H04B 7/06* (2006.01)
*H04W 88/08* (2009.01)

(52) U.S. Cl.
CPC .............. *H04W 16/28* (2013.01); *H04B 7/06* (2013.01); *H04B 7/068* (2013.01); *H04B 7/0617* (2013.01); *H04B 7/0691* (2013.01); *H04B 7/0695* (2013.01); *H04W 88/08* (2013.01)

(58) Field of Classification Search
CPC ..... H04W 52/30; H04W 16/28; H04W 88/08; H04B 7/0695; H04B 7/0691; H04B 7/068; H04B 7/0617; H04B 7/06
See application file for complete search history.

(56) References Cited

U.S. PATENT DOCUMENTS

| 6,016,123 A | 1/2000 | Barton et al. |
| 8,149,942 B1 | 4/2012 | Wang et al. |
| 8,537,785 B2 | 9/2013 | Yang et al. |
| 2002/0057660 A1* | 5/2002 | Park ................ H01Q 1/246 370/335 |

(Continued)

FOREIGN PATENT DOCUMENTS

| EP | 2579677 A1 | 4/2013 |
| WO | WO-2009013527 A1 | 1/2009 |

OTHER PUBLICATIONS

ISA/EPO, International Search Report and Written Opinion of the International Searching Authority, Int'l App. No. PCT/US2014/067952, Mar. 31, 2015, European Patent Office, Rijswijk, NL, 11 pgs.

*Primary Examiner* — Joseph Dean, Jr

(74) *Attorney, Agent, or Firm* — Holland & Hart LLP

(57) ABSTRACT

Methods, systems, and devices are described for transmitting across a broad azimuth using an antenna array. In one example, a method is described that includes forming two subarrays from an antenna array. Beamforming weights are selected for each subarray to cause the radiation patterns to be complementary over a range of the azimuth of a cell. The beamforming weights may be selected according to a recursive relation based on the number of antenna elements in each subarray. Information may be encoded, scrambled, and mapped to modulation symbols. A Space Frequency Block Code (SFBC) such as an Alamouti Code may then be used to form two signals to be transmitted over the two subarrays.

30 Claims, 10 Drawing Sheets

(56) References Cited

U.S. PATENT DOCUMENTS

| | | | |
|---|---|---|---|
| 2005/0286650 A1* | 12/2005 | Han | H04B 7/0417 |
| | | | 375/267 |
| 2007/0049347 A1 | 3/2007 | Jin et al. | |
| 2007/0182619 A1* | 8/2007 | Honda | H01Q 25/02 |
| | | | 342/80 |
| 2010/0054356 A1 | 3/2010 | Keerthi | |
| 2011/0243040 A1* | 10/2011 | Khan | H04B 7/0617 |
| | | | 370/280 |
| 2013/0057432 A1 | 3/2013 | Rajagopal et al. | |
| 2013/0076566 A1 | 3/2013 | Jiang et al. | |
| 2013/0162476 A1 | 6/2013 | Thomas et al. | |
| 2014/0235287 A1* | 8/2014 | Maltsev | H04W 52/267 |
| | | | 455/522 |
| 2015/0092621 A1* | 4/2015 | Jalloul | H04L 5/143 |
| | | | 370/278 |

\* cited by examiner

USING SUBARRAYS OF A BEAMFORMER FOR TRANSMISSIONS IN A FORWARD LINK

BACKGROUND

The following relates generally to wireless communication, and more specifically to using subarrays of a beamformer to transmit control channels from a base station in a forward link. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. These mobile devices may be ground-based or located in an airborne vehicle such as an airplane or helicopter. Base stations may communicate with mobile devices on forward and reverse links. Each base station has a coverage range, which may be referred to as the coverage area of the cell.

Base stations may be equipped with an array of antenna elements which transmit together to form a narrow beam aimed at a single mobile device. In some cases, however, more than one mobile device will inhabit a single cell. When this happens, the base station may wish to communicate common information to every mobile device in its coverage area simultaneously. This may require communicating over a broad angular range (azimuth). To communicate over a broad angle, the base station may transmit using a single antenna element rather than using all of its antenna elements. A single antenna, however, transmits at a high power level in order to reach the edges of the cell, and this presents a constraint on antenna design at the base station.

SUMMARY

The described features generally relate to at least one improved method and apparatus for transmitting control channels across a broad azimuth using an antenna array. In one example, a method is described that includes forming two subarrays from an antenna array. Beamforming weights are selected for each subarray so that the radiation patterns are complementary over a range of the azimuth of a cell. The beamforming weights may be selected according to a recursive relation based on the number of antenna elements in each subarray. Information may be encoded, scrambled, and mapped to modulation symbols. A Space Frequency Block Code (SFBC) such as an Alamouti Code may then be used to form two signals to be transmitted over the two subarrays.

In one embodiment the method described is used to transmit a control channel. In another embodiment, the recursive relation comprises a repeatable algorithm for using two sets of beamforming weights with an initial number of elements to construct two additional sets of beamforming weights with twice the initial number of elements. The recursive relation may also be based at least in part on at least one design parameter. In this case, the one or more design parameter values may be chosen based on a transmission condition and the beamforming weights for the two subarrays may be dynamically updated based on changes in the design parameter values.

In one example, the sum of the power radiation pattern of the first subarray and the power radiation pattern of the second subarray is constant over the range of the azimuth angle of the cell. In another example, the first set of array elements and the second set of array elements have the same element pattern.

At least one individual array element of the first subarray or the second subarray may be omnidirectional over the range of the azimuth angle of the cell. In one embodiment, the array antenna may be a uniform linear array antenna.

Also described is an apparatus for transmitting data using an array antenna in a wireless communications system comprising means for forming a first subarray from a first set of array elements of an array antenna, means for forming a second subarray from a second set of array elements of the array antenna, and means for selecting a first set of beamforming weights for the first subarray and a second set of beamforming weights for the second subarray, the selected beamforming weights causing a power radiation pattern of the first subarray to be complementary to a power radiation pattern of the second subarray over a range of an azimuth angle of a cell, wherein the selecting is based at least in part on a recursive relation based at least in part on a number of elements in the first subarray and the second subarray.

An apparatus is described for transmitting data using an array antenna in a wireless communications system comprising a processor, memory in electronic communication with the processor, and instructions stored in the memory, the instructions being executable by the processor to form a first subarray from a first set of array elements of an array antenna, form a second subarray from a second set of array elements of the array antenna, and select a first set of beamforming weights for the first subarray and a second set of beamforming weights for the second subarray, the selected beamforming weights causing a power radiation pattern of the first subarray to be complementary to a power radiation pattern of the second subarray over a range of an azimuth angle of a cell, wherein the selecting is based at least in part on a recursive relation based at least in part on a number of elements in the first subarray and the second subarray.

A computer program product is also described for transmitting data using an array antenna in a wireless communications system, the computer program product comprising a non-transitory computer-readable medium storing instructions executable by a processor to form a first subarray from a first set of array elements of an array antenna, form a second subarray from a second set of array elements of the array antenna, and select a first set of beamforming weights for the first subarray and a second set of beamforming weights for the second subarray, the selected beamforming weights causing a power radiation pattern of the first subarray to be complementary to a power radiation pattern of the second subarray over a range of an azimuth angle of a cell, wherein the selecting is based at least in part on a recursive relation based at least in part on a number of elements in the first subarray and the second subarray.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to at least one improved apparatus and method for transmitting information, such as control channels, across a broad azimuth using an antenna array. In one example, a method is described that includes forming two subarrays from an antenna array. Beamforming weights are selected for each subarray so that the radiation patterns are complementary over a range of the azimuth of a cell. The beamforming weights are selected according to a recursive relation based on the number of antenna elements in each subarray. Information may be encoded, scrambled, and mapped to modulation symbols. A Space Frequency Block Code (SFBC) such as an Alamouti Code may then be used to form two signals to be transmitted over the two subarrays.

The combined power radiation pattern of the subarrays may be constant or approximately constant over a range of an azimuth of a cell. The use of the SFBC ensures that a mobile device at an azimuth in this range can reliably receive the modulation symbols regardless of which subarray has a higher transmit power at that position. This allows a base station to transmit broadcast information using all of its antenna elements, which obviates the need to design base stations with a single element capable of transmitting throughout the whole range of the cell.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
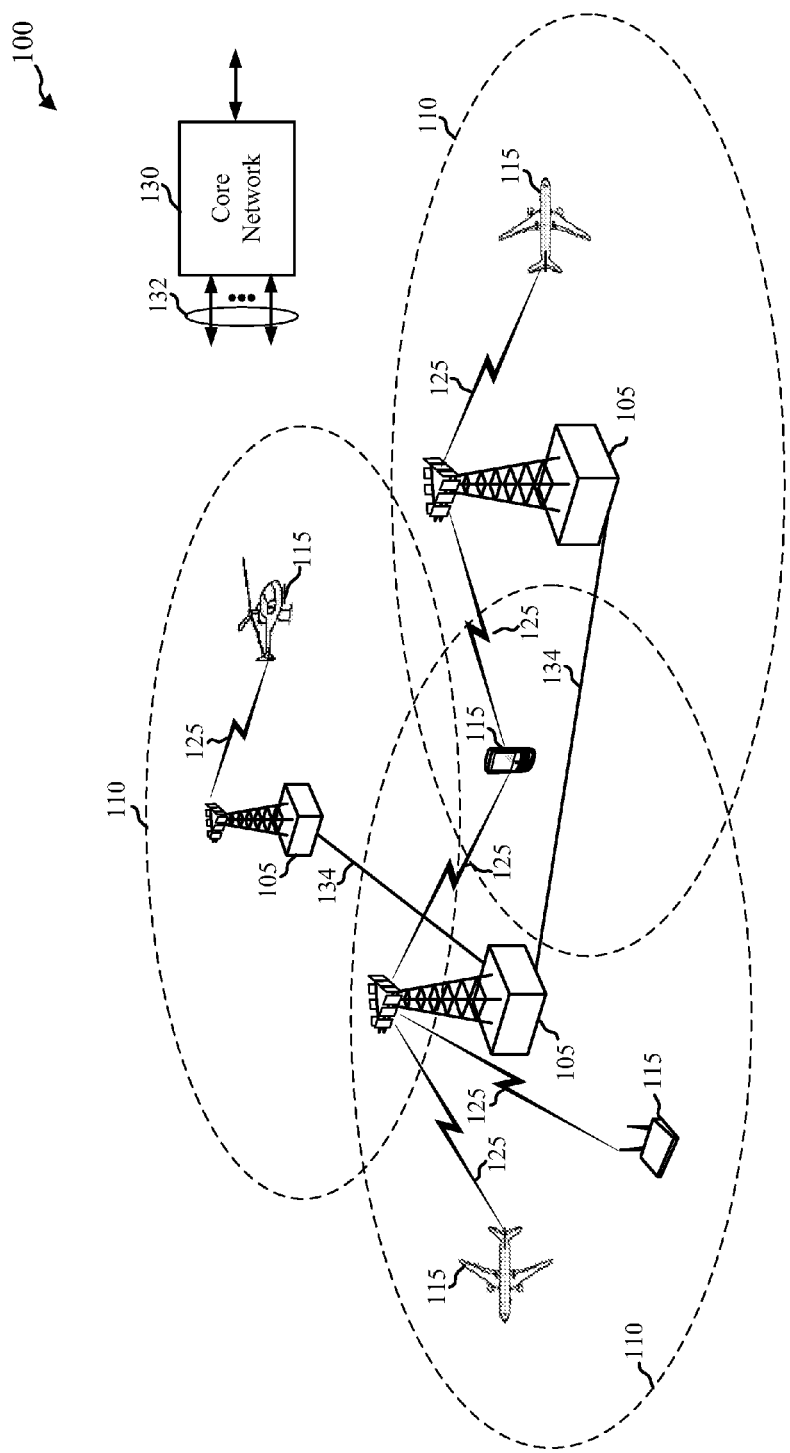
FIG. 1 shows a diagram of a wireless communications system.

Referring first to FIG. 1, a diagram illustrates an example of a wireless communication system 100. The wireless communication system 100 includes a number of base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the mobile device 115 via one or more base station antennas. Each of the base station 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro, micro, and/or pico base stations). There may be overlapping coverage areas for different technologies.

The core network 130 may communicate with the base stations 105 via a backhaul links 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The mobile devices 115 are dispersed throughout the wireless communication system 100, and each mobile device 115 may be stationary or mobile. A mobile device 115 may be ground based or located on an airborne vehicle such as an airplane, helicopter, or balloon. A mobile device 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a two-way radio, a radio cellular phone, a personal digital assistant (PDA), a wireless modem, a wireless communication device, a handheld device, a tablet computer, a laptop computer, a cordless phone, a wireless local loop (WLL) station, or the like.

The communication links 125 shown in wireless communication system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Figure 2:
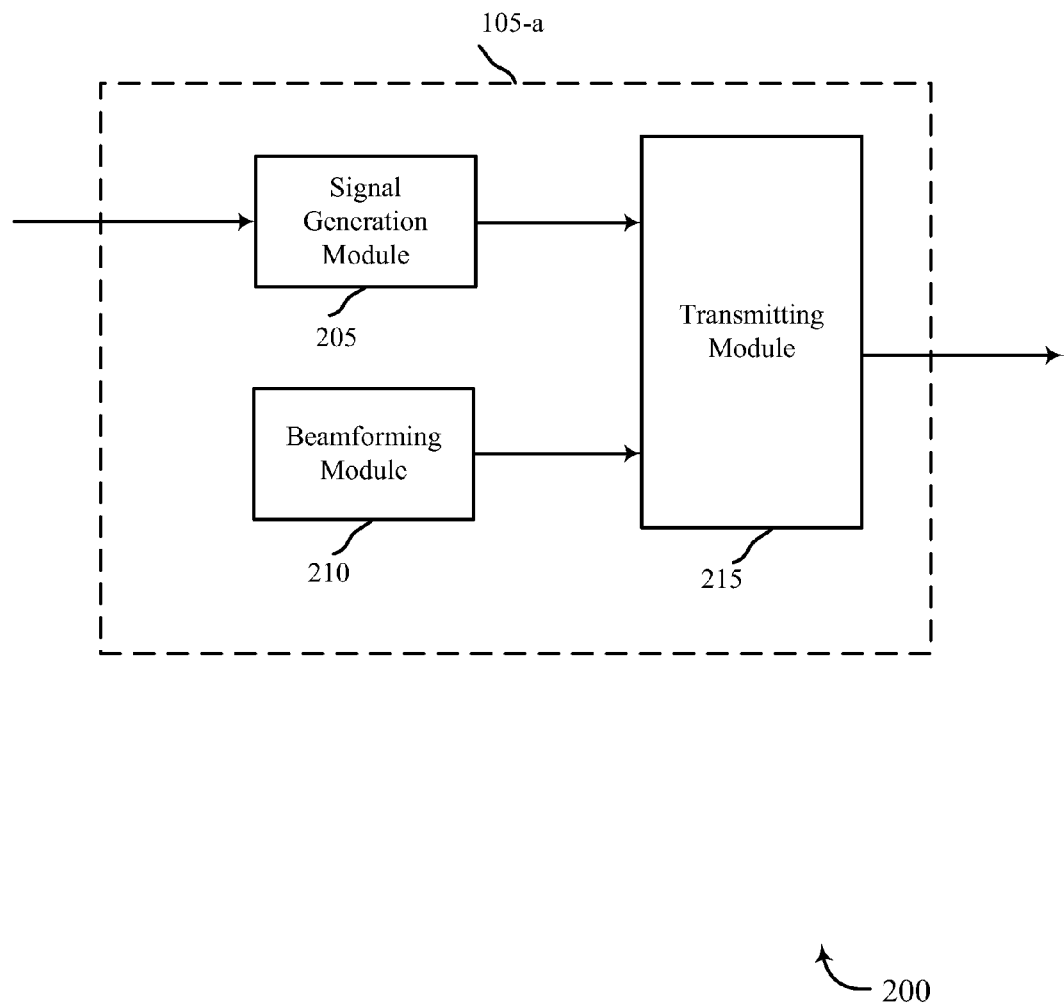
FIG. 2 shows a block diagram of an exemplary base station.

Turning next to FIG. 2, a block diagram 200 illustrates a base station 105-a for transmitting data using an array antenna in accordance with various embodiments. The base station 105-a may be an example of one or more aspects of a base station 105 described with reference to FIG. 1. The base station 105-a may also include a processor. The base station 105-a may include a signal generation module 205, a beamforming module 210, and/or a transmitting module 215. Each of these components may be in communication with each other.

These components of the base station 105-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the base station 105-a.

The signal generation module 205 may receive information such as packets, user data, and/or control information. The received information may be encoded, rate matched, interleaved, scrambled, and mapped to the modulation symbols. The parallel signals are generated from the modulation symbols according to an SFBC such as an Alamouti code. The signals may be passed on to the transmitting module 215.

The beamforming module 210 may form one or more subarrays from an array antenna, and select beamforming weights for the array elements. The beamforming weights may also be passed on to the transmitting module 215.

The transmitting module 215 may transmit the one or more signals received from the signal generation module 205 according to the beamforming weights selected by the beamforming module 210. The transmitting module may include, but is not limited to, an array antenna, which may in some embodiments be a uniform linear array antenna.

Figure 3:
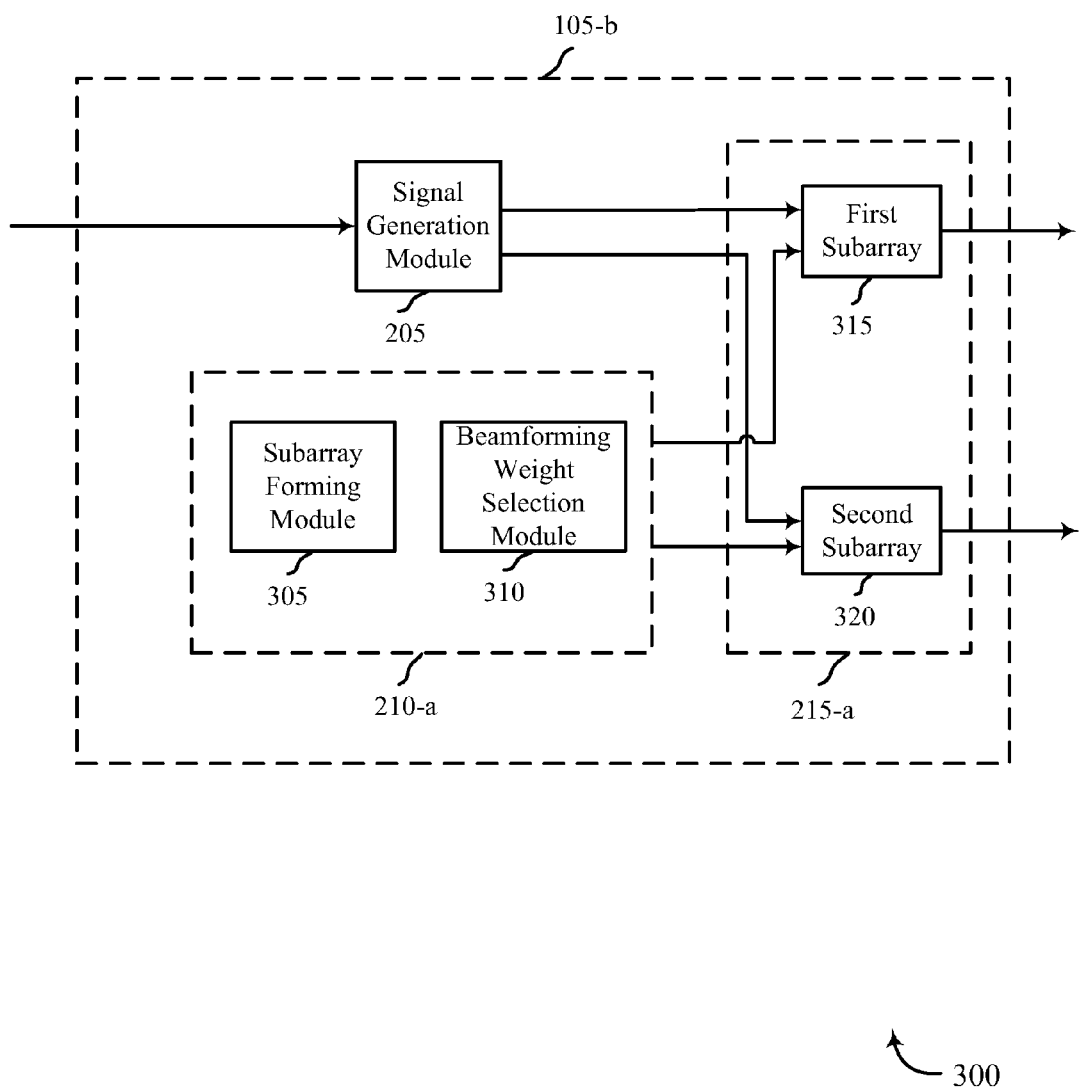
FIG. 3 shows a block diagram of an example of a base station depicting composition of the beamforming module and the transmitting module.

Turning next to FIG. 3, a block diagram 300 illustrates a base station 105-b for transmitting data using an array antenna in accordance with various embodiments. The base station 105-b may be an example of one or more aspects of a base station 105 described with reference to FIG. 1 or FIG. 2. The base station 105-b may include a signal generation module 205, a beamforming module 210-a, and/or a transmitting module 215-a. Each of these components may be in communication with each other.

These components of the base station 105-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the base station 105-b.

The signal generation module 205 may receive information such as packets, user data, and/or control information. The received information may be encoded, rate matched, interleaved, scrambled, and mapped to the modulation symbols. The parallel signals are generated from the modulation symbols according to an SFBC such as an Alamouti code. The signals may be passed on to the transmitting module 215. A first signal may be passed on to the first subarray 315 and a second signal may be passed on to the second subarray 320.

The beamforming module 210 may form one or more subarrays from an array antenna, and select beamforming weights for the array elements. The beamforming weights may also be passed on to the transmitting module 215. The beamforming module 210-a may include a subarray forming module 305 and/or a beamforming weight selection module 310.

The transmitting module 215 may transmit the one or more signals received from the signal generation module 205 according to the beamforming weights selected by the beamforming module 210. The transmitting module may include, but is not limited to, an array antenna, which may in some embodiments be a uniform linear array antenna.

In one embodiment, the transmitting module 215-a transmits a control channel using the first subarray 315 and the second subarray 320. Thus, the transmitting module 215-a may be a means for transmitting a control channel using the first subarray 315 and the second subarray 320.

The subarray forming module 305 may form a first subarray 315 from a first set of array elements of an array antenna in the transmitting module 215-a and may also form a second subarray 320 from a second set of array elements of the array antenna.

The beamforming weight selection module 310 may select a first set of beamforming weights for the first subarray 315 and a second set of beamforming weights for the second subarray 320. The selected beamforming weights may cause a power radiation pattern of the first subarray 315 to be complementary to the power radiation pattern of the second subarray 320 over a range of an azimuth angle of a cell. The beamforming weights may be selected based at least in part on a recursive relation, which may be based at least in part on a number of elements in the first subarray 315 and the second subarray 320. The recursive relation may comprise a repeatable algorithm for using a third set of beamforming weights with an initial number of elements and a fourth set of beamforming weights with the initial number of elements to construct a fifth set of beamforming weights with twice the initial number of elements and a sixth set of beamforming weights with twice the initial number of elements.

The beamforming weight selection module 310 may select beamforming weights weights $\{a_l^{(n)}\}_{l=0}^{n-1}$ for the first subarray 315 and beamforming weights $\{b_l^{(n)}\}_{l=0}^{n-1}$ for the second subarray 320, where n represents the number of elements in each subarray. $A_k^{(n)}(\Omega)$ may denote the array factor that would be formed by the first subarray 315, which may consist of the n elements, $\{k, k+1, \ldots, k+n-1\}$, where k is the index of the first element in the subarray:

$$A_k^{(n)}(\Omega) \triangleq e^{j\pi k \Omega} \sum_{l=0}^{n-1} a_l^{(n)} e^{j\pi l \Omega} \quad (1)$$

The expression $B_k^{(n)}(\Omega)$ may denote the array factor that would be formed by the second subarray 320, which also may consist of the n elements, $\{k, k+1, \ldots, k+n-1\}$, where k is the index of the first element in the subarray:

$$B_k^{(n)}(\Omega) \triangleq e^{j\pi k \Omega} \sum_{l=0}^{n-1} b_l^{(n)} e^{j\pi l \Omega} \quad (2)$$

The variable $\Omega$ is defined according to $\Omega \triangleq \sin \phi$, the parameter $\phi$ being the broadside angle for the mobile device 115. The broadside angle is related to the azimuth angle and the elevation angle by:

$$\sin \phi = \sin(\text{azimuth angle}) \cdot \sin(\text{elevation angle}) \quad (3)$$

If the first subarray is formed with the elements $\{k, k+1, \ldots, k+n-1\}$ and the second subarray is formed with the elements $\{k+n, k+n+1, \ldots, k+2n-1\}$ then the array factors formed by these two subarrays may be represented by $A_k^{(n)}(\Omega)$ and $B_{k+n}^{(n)}(\Omega)$. For example, each subarray may consist of 16 elements with k=0 and the array factors may be represented by $A_0^{(16)}(\Omega)$ and $B_{16}^{(16)}(\Omega)$. The corresponding beamforming coefficients are given by $\{a_l^{(16)}\}_{l=0}^{15}$ and $\{b_l^{(16)}\}_{l=0}^{15}$.

The sum of the array factor power patterns of two n-element subarrays may be given by $G^{(n)}(\Omega)$ $$G^{(n)}(\Omega) \triangleq |A_k^{(n)}(\Omega)|^2 + |B_{k+n}^{(n)}(\Omega)|^2 \quad (4)$$

In the following, a method to construct the beamforming weights $\{a_l^{(n)}\}_{l=0}^{n-1}$ for the first subarray, and the beamforming weights $\{b_l^{(n)}\}_{l=0}^{n-1}$ for the second subarray is presented.

The beamforming weight selection module 310 may select beamforming weights for the first subarray 315 and the second subarray 320 according to the recursive relations:

$$A_k^{(2m)}(\Omega) = e^{j\varphi_1^{(m)}} \left( A_k^{(m)}(\Omega) + e^{j\varphi_0^{(m)}} B_{k+m}^{(m)}(\Omega) \right) \quad (5)$$

and:

$$B_{k+2m}^{(2m)}(\Omega) = e^{j\varphi_2^{(m)}} \left( A_{k+2m}^{(m)}(\Omega) - e^{j\varphi_0^{(m)}} B_{k+3m}^{(m)}(\Omega) \right) \quad (6)$$

The variables $\varphi_0^{(m)}$, $\varphi_1^{(m)}$ and $\varphi_2^{(m)}$ are design parameters that may be selected arbitrarily or based at least in part on one or more transmission conditions. The beamforming weight selection module 310 may update the beamforming weights based at least in part on an update of at least one design parameter value. Thus, the beamforming weight selection module 310 may be a means for selecting a first set of beamforming weight for the first subarray 315 and a second set of beamforming weight for the second subarray 320.

Equivalently, the beamforming weights may be selected according to the relations:

$$\underline{a}^{(2m)} = e^{j\varphi_1^{(m)}} \left[ \underline{a}^{(m)}, \underline{b}^{(m)} e^{j\varphi_0^{(m)}} \right] \quad (7)$$

and $$\underline{b}^{(2m)} = e^{j\varphi_2^{(m)}} \left[ \underline{a}^{(m)}, -\underline{b}^{(m)} e^{j\varphi_0^{(m)}} \right] \quad (8)$$

where $\underline{a}^{(m)}$ and $\underline{b}^{(m)}$ are the vectors defined as $$\underline{a}^{(m)} = [a_0^{(m)}, a_1^{(m)}, \ldots, a_{m-1}^{(m)}] \quad (9)$$

and $$\underline{b}^{(m)} = [b_0^{(m)}, b_1^{(m)}, \ldots, b_{m-1}^{(m)}] \quad (10)$$

In one example, the beamforming weight selection module 310 begins the recursive calculation with single element subarrays of unit energy:

$$|a_0^{(1)}| = |b_0^{(1)}| = 1, \quad (11)$$

resulting in array factors for the single element subarrays of:

$$A_k^{(1)}(\Omega) = a_0^{(1)} e^{j\pi k \Omega} \quad (12)$$

$$B_k^{(1)}(\Omega) = b_0^{(1)} e^{j\pi k \Omega} \quad (13)$$

The beamforming weights for subarrays with more elements may then be calculated according to the recursive relation given above. In other examples, the beamforming weight selection module 310 begins the recursive relation with the weights of subarrays having more than one element, i.e. $\{a_l^{(m_0)}\}_{l=0}^{m_0-1}$ and $\{b_l^{(m_0)}\}_{l=0}^{m_0-1}$ for some positive integer $m_0 \geq 2$, which are known to form a constant sum of array factor patterns, $G^{(m_0)}(\Omega)$, over the range of an azimuth angle of the cell.

The beamforming weights may be chosen by the beamforming weight selection module 310 such that the sum of the power radiation pattern of the first subarray 315 and the power radiation pattern of the second subarray 320 is constant over a range of an azimuth angle of a cell. For example, if all of the array elements have the same element pattern, the radiation pattern of a subarray may be given by the product of the array factor of the subarray and the element pattern. Accordingly, the sum of the power radiation patterns of the two subarrays may be given by the product of the power radiation pattern of the array element and the sum of the array factor power patterns $G^{(n)}(\Omega)$. Since the individual array elements may be nearly omnidirectional over the possible range of the azimuth angle of the mobile devices in the cell, the sum of the power radiation patterns of the two subarrays may be approximated as $G^{(n)}(\Omega)$.

Therefore, the beamforming weights for each of the two subarrays may be chosen such that the sum of the array factor power patterns $G^{(n)}(\Omega)$ becomes constant over the possible range of the azimuth angle of the mobile devices in the cell using the method given above.

Since for any integer $k_0$, $$A_{k+k_0}^{(n)}(\Omega) = e^{j\pi k_0 \Omega} A_k^{(n)}(\Omega) \quad (14)$$

$$B_{k+k_0}^{(n)}(\Omega) = e^{j\pi k_0 \Omega} B_k^{(n)}(\Omega) \quad (15)$$

The sum of the array factor power patters, $G^{(n)}(\Omega)$, may be calculated according to the formula:

$$G^{(n)}(\Omega)=|A_0^{(n)}(\Omega)|^2+B_0^{(n)}(\Omega)|^2 \quad (16)$$

In the case that each subarray has n array elements, and $n=m_0\times 2^q$, for some positive integers $m_0$ and $q$, where $\{a_l^{(n)}\}_{l=0}^{n-1}$ and $\{b_l^{(n)}\}_{l=0}^{n-1}$ are obtained from $\{a_l^{(m_0)}\}_{l=0}^{m_0-1}$ and $\{b_l^{(m_0)}\}_{l=0}^{m_0-1}$ by using the recursive relations given above, it can be shown that:

$$G^{(n)}(\Omega) = \frac{n}{m_0}G^{(m_0)}(\Omega) \quad (17)$$

Therefore, as long as the beamforming weights $\{a_l^{(m_0)}\}_{l=0}^{m_0-1}$ for the first subarray 315 and $\{b_l^{(m_0)}\}_{l=0}^{m_0-1}$ for the second subarray 320 may then be chosen so that $G^{(m_0)}(\Omega)$ is constant for all $\Omega$, the $G^{(n)}(\Omega)$ corresponding to $\{a_l^{(n)}\}_{l=0}^{n-1}$ and $\{b_l^{(n)}\}_{l=0}^{n-1}$ is constant over the range $|\Omega|<1$, or $$|\phi| < \frac{\pi}{2}.$$

As one example, choose $a_0^{(1)}=b_0^{(1)}=1$, and $\phi_0^{(m)}=\phi_1^{(m)}=\phi_2^{(m)}=0$, for all m. For two element subarrays this example gives beamforming weights:

| | |
|---|---|
| $\underline{a}^{(2)} = [1, 1]$ | (First subarray 315) |
| $\underline{b}^{(2)} = [1, -1]$ | (Second subarray 320) |

For four element subarrays the example gives:

| | |
|---|---|
| $\underline{a}^{(4)} = [1, 1, 1, -1]$ | (First subarray 315) |
| $\underline{b}^{(4)} = [1, 1, -1, 1]$ | (Second subarray 320) |

For eight element subarrays the example gives:

| | |
|---|---|
| $\underline{a}^{(8)} = [1, 1, 1, -1, 1, 1, -1, 1]$ | (First subarray 315) |
| $\underline{b}^{(8)} = [1, 1, 1, -1, -1, -1, 1, -1]$ | (Second subarray 320) |

For sixteen element subarrays the example gives:

| | |
|---|---|
| $\underline{a}^{(16)} = [1, 1, 1, -1, 1, 1, -1, 1, 1, 1, 1, -1, -1, -1, -1, -1, 1, -1]$ | (First subarray 315) |
| $\underline{b}^{(16)} = [1, 1, 1, -1, 1, 1, -1, 1, -1, -1, -1, 1, 1, -1, 1]$ | (Second subarray 320) |

As another example, choose $$a_0^{(1)} = b_0^{(1)} = 1 \text{ and } \varphi_0^{(m)} = \varphi_2^{(m)} = \frac{\pi}{2}, \varphi_1^{(m)} = 0,$$

for all m. For two element subarrays this example gives beamforming weights:

| | |
|---|---|
| $\underline{a}^{(2)} = [1, j]$ | (First subarray 315) |
| $\underline{b}^{(2)} = [j, 1]$ | (Second subarray 320) |

For four element subarrays the example gives:

| | |
|---|---|
| $\underline{a}^{(4)} = [1, j, -1, j]$ | (First subarray 315) |
| $\underline{b}^{(4)} = [j, -1, j, 1]$ | (Second subarray 320) |

For eight element subarrays the example gives:

| | |
|---|---|
| $\underline{a}^{(8)} = [1, j, -1, j, -1, -j, -1, j]$ | (First subarray 315) |
| $\underline{b}_l^{(8)} = a_{7-l}^{(8)}, l = 0, 1, \ldots, 7$ | (Second subarray 320) |

For sixteen element subarrays the example gives:

| | |
|---|---|
| $\underline{a}^{(16)} = [1, j, -1, j, -1, -j, -1, j, -1, -j,$ $1, -j, -1, -j, -1, j]$ | (First subarray 315) |
| $\underline{b}_l^{(16)} = a_{15-l}^{(16)}, l = 0, 1, \ldots, 15$ | (Second subarray 320) |

The first subarray 315 and the second subarray 320 may transmit using the selected beamforming weights according to a Space Frequency Block Code (SFBC). The SFBC may be based on an Alamouti code. According to a version of the Alamouti code, two modulation symbols are transmitted over a pair of subcarriers. On the first subcarrier, the modulation symbol $x_0$ is transmitted using the first subarray 315. The modulation symbol $-x^*_1$ is transmitted using the second subarray 320. On the second subcarrier, which may be adjacent to the first subcarrier, the modulation symbol $x_1$ may be transmitted using the first subarray 315, and the modulation symbol $x^*_0$ may be transmitted using the second subarray 320.

The received signals on this pair of adjacent subcarriers at a mobile device 115 receive antenna may be written as:

$$r_0 = H_0 x_0 - H_1 x^*_1 + n_0 \quad (18)$$

$$r_1 = H_0 x_1 + H_1 x^*_0 + n_1 \quad (19)$$

where $H_0$ is the channel gain from the first subarray 315 to the mobile device 115 receive antenna on this pair of subcarriers, $H_1$ is the channel gain from the second subarray 320 to the mobile device 115 receive antenna on this pair of subcarriers, and $n_0$ and $n_1$ represent the noise and interference seen on the first and second subcarriers, respectively.

The estimates of the modulation symbols $x_0$ and $x_1$ may be obtained by $$\hat{x}_0 = H^*_0 r_0 + H_1 r^*_1 \quad (20)$$

$$\hat{x}_1 = H^*_0 r_1 - H_1 r^*_0 \quad (21)$$

The signal component of $\hat{x}_0$ and $\hat{x}_1$ are given by $$E[\hat{x}_0] = \|H\|^2 x_0 \quad (22)$$

$$E[\hat{x}_1] = \|H\|^2 x_1 \quad (23)$$

where $E[\bullet]$ denotes the ensemble average, and $$\|H\|^2 \triangleq |H_0|^2 + |H_1|^2 \quad (24)$$

where $H_0$ and $H_1$ are the functions of the radiation patterns of the first subarray 315 and the second subarray 320 respectively, and $\|H\|^2$ being proportional to the sum of the power radiation patterns of the two subarrays.

Since the beamforming weights for the subarrays are chosen such that the sum of the power radiation patterns of the two subarrays is nearly constant over the possible range of azimuth angle of the mobile device 115 in the cell, the received modulation symbol obtained after the demodulation processing shown above appears as though it were obtained from processing the signal transmitted from a single antenna with a very broad beam.

Figure 4:
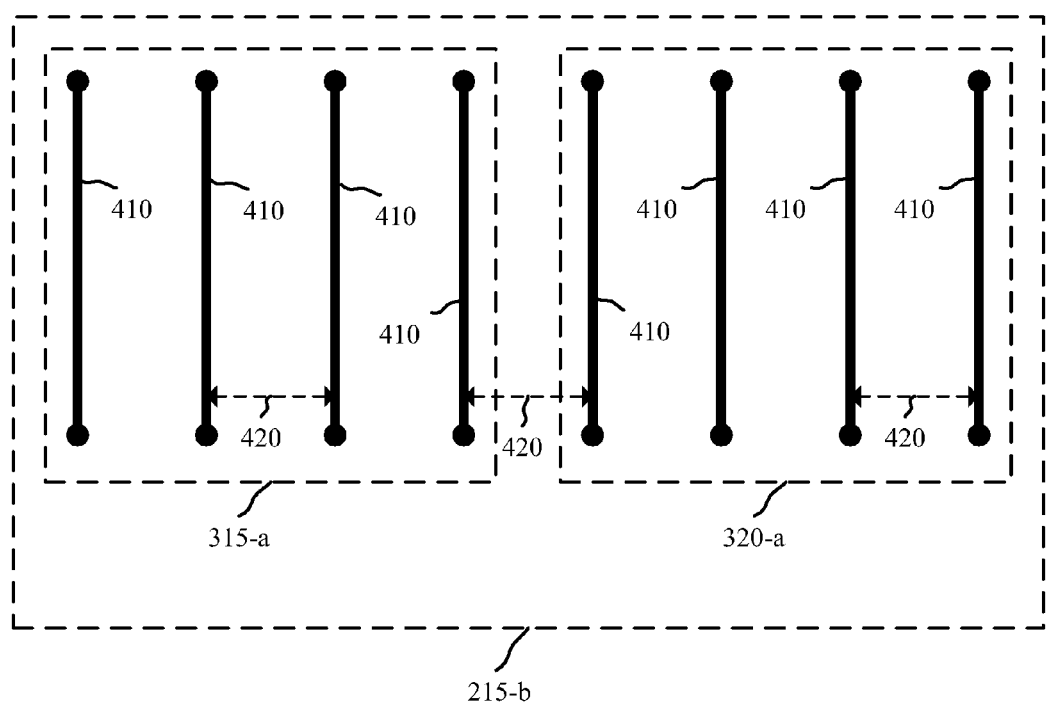
FIG. 4 shows a block diagram of an example of a transmitting module.

Turning next to FIG. 4, a block diagram 400 illustrates a transmitting module 215-b for transmitting data which may include an array antenna in accordance with various embodiments. The transmitting module 215-b may be an example of one or more aspects of a transmitting module 215 described with reference to FIG. 2 and/or FIG. 3. The transmitting module 215-b may include a first subarray 315-a, a second subarray 320-a, a plurality of array elements 410, and at least one distance between array elements 420.

These components of the transmitting module 215-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the transmitting module 215-b.

In one embodiment, the distance between array elements 420 may be the same, but in other embodiments it may be different. In one embodiment, the transmitting module 215-b may include a uniform linear array antenna. In other embodiments, the transmitting module 215-b may include an array antenna that is a non-uniform linear array antenna.

In one embodiment, half of the array elements 410 may be included in the first subarray 315-a and the other half of the array elements 410 may be included in the second subarray 320-a. However, other embodiments are possible, such as alternating array elements 410 between the first subarray 315-a and the second subarray 320-a, or including all array elements 410 in first subarray 315-a and also in the second subarray 320-a.

In one embodiment, the array elements 410 of the first subarray 315 and the second subarray 320 have a same element pattern. In other embodiments, different patterns may be used to form the first subarray 315 and the second subarray 320.

Figure 5:
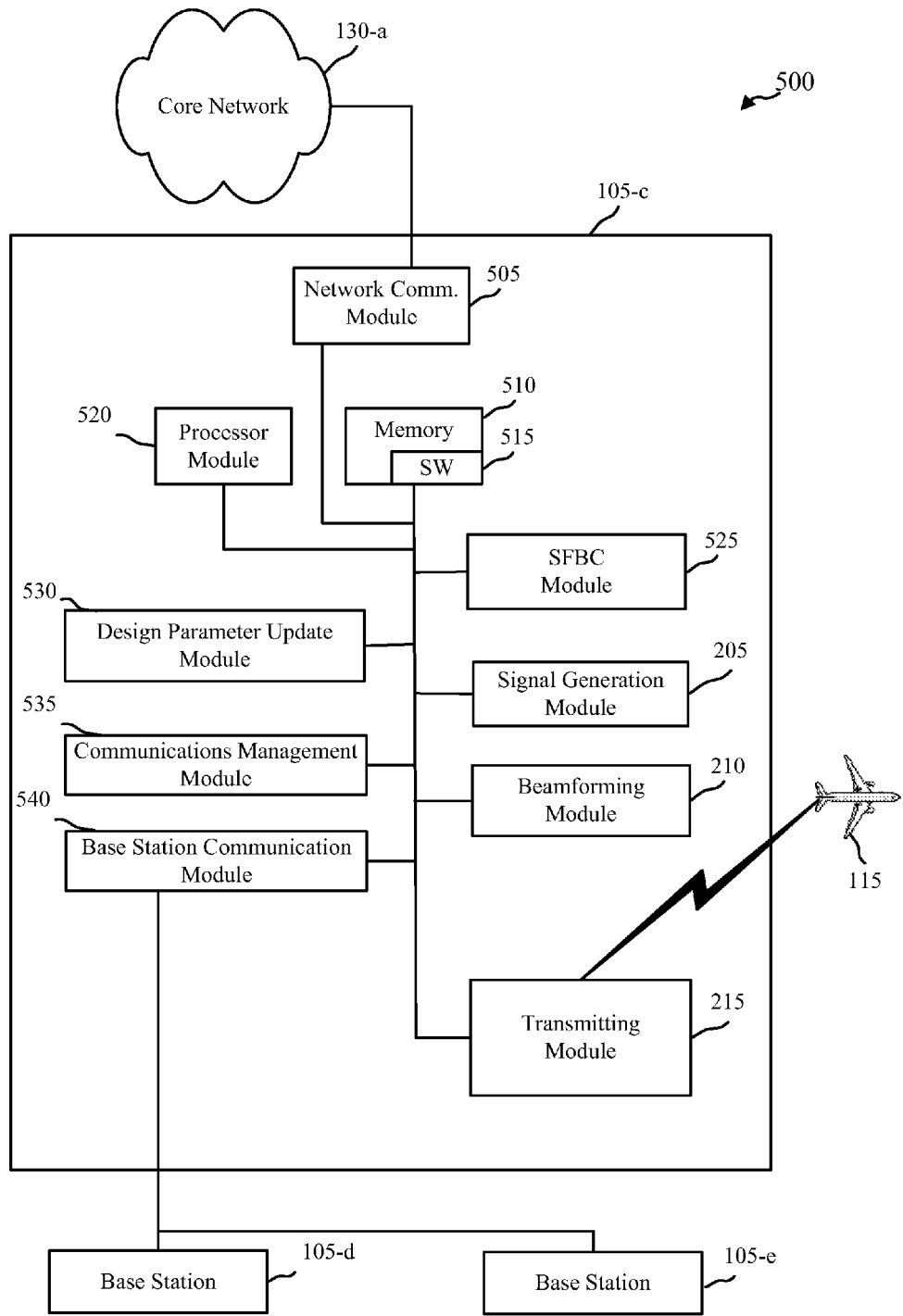
FIG. 5 shows a block diagram of an example of a base station implementing additional functions.

Turning next to FIG. 5, a block diagram is illustrated of a communications system 500 that may be configured for transmitting data using an array antenna. This communications system 500 may be an example of aspects of the wireless communication system 100 depicted in FIG. 1. Communications system 500 may include a base station 105-c, which may be an example of base station 105 depicted in FIGS. 1-3. The base station 105-c may include a signal generation module 205, a beamforming module 210, a transmitting module 215, memory 510, a processor module 520, an SFBC module 525, and a design parameter update module 530, which each may be in communication, directly or indirectly, with each other (e.g., over one or more buses). The transmitting module 215 may be configured to communicate bi-directionally with one or more networks. In some cases, the base station 105-c may communicate with the core network 130-a through a network communication module 505. The communications system 500 may also comprise a non-transitory computer-readable medium storing instructions executable by a processor that may be included in the processor module 520. The memory 510 may be in electronic communication with the processor module 520.

Base station 105-c may also communicate with other base stations 105, such as base station 105-d and base station 105-e. In some cases, base station 105-c may communicate with other base stations 105 utilizing a base station communication module 540. In some embodiments, base station communication module 540 may provide an X2 interface within an LTE wireless communication technology to provide communication between some of the base stations 105. In some embodiments, base station 105-c may communicate with other base stations 105 through core network 130-a.

The memory 510 may include random access memory (RAM) and read-only memory (ROM). The memory 510 may also store computer-readable, computer-executable software code 515 containing instructions that are configured to, when executed, cause the processor module 520 to perform various functions described herein (e.g., call processing, database management, message routing, etc.). Alternatively, the software code 515 may not be directly executable by the processor module 520 but may be configured to cause the computer, e.g., when compiled and executed, to perform functions described herein.

The processor module 520 may include an intelligent hardware device, e.g., a central processing unit (CPU), a microcontroller, an application-specific integrated circuit (ASIC), etc.

According to the architecture of FIG. 5, the base station 105-c may further include a communications management module 535. The communications management module 535 may manage communications with other base stations 105. By way of example, the communications management module 535 may be a component of the base station 105-c in communication with some or all of the other components of the base station 105-c via a bus. Alternatively, functionality of the communications management module 535 may be implemented as a component of the transmitting module 215, as a computer program product, and/or as one or more controller elements of the processor module 520.

The components for base station 105-c may be configured to implement aspects discussed above and may not be repeated here for the sake of brevity. For example, the beamforming module 210 may include similar functionality as the beamforming module 210 of FIG. 2 and/or FIG. 3.

In some embodiments, the transmitting module 215, along with other possible components of base station 105-c, may transmit data using subarrays whose beamforming weights have been selected to cause the sum of the power radiation patterns to be constant over an azimuth angle of a cell. In some embodiments, the transmitting module 215, along with other possible components of base station 105-c, may transmit on the subarrays based at least in part on a SFBC based at least in part on an Alamouti code.

Figure 6:
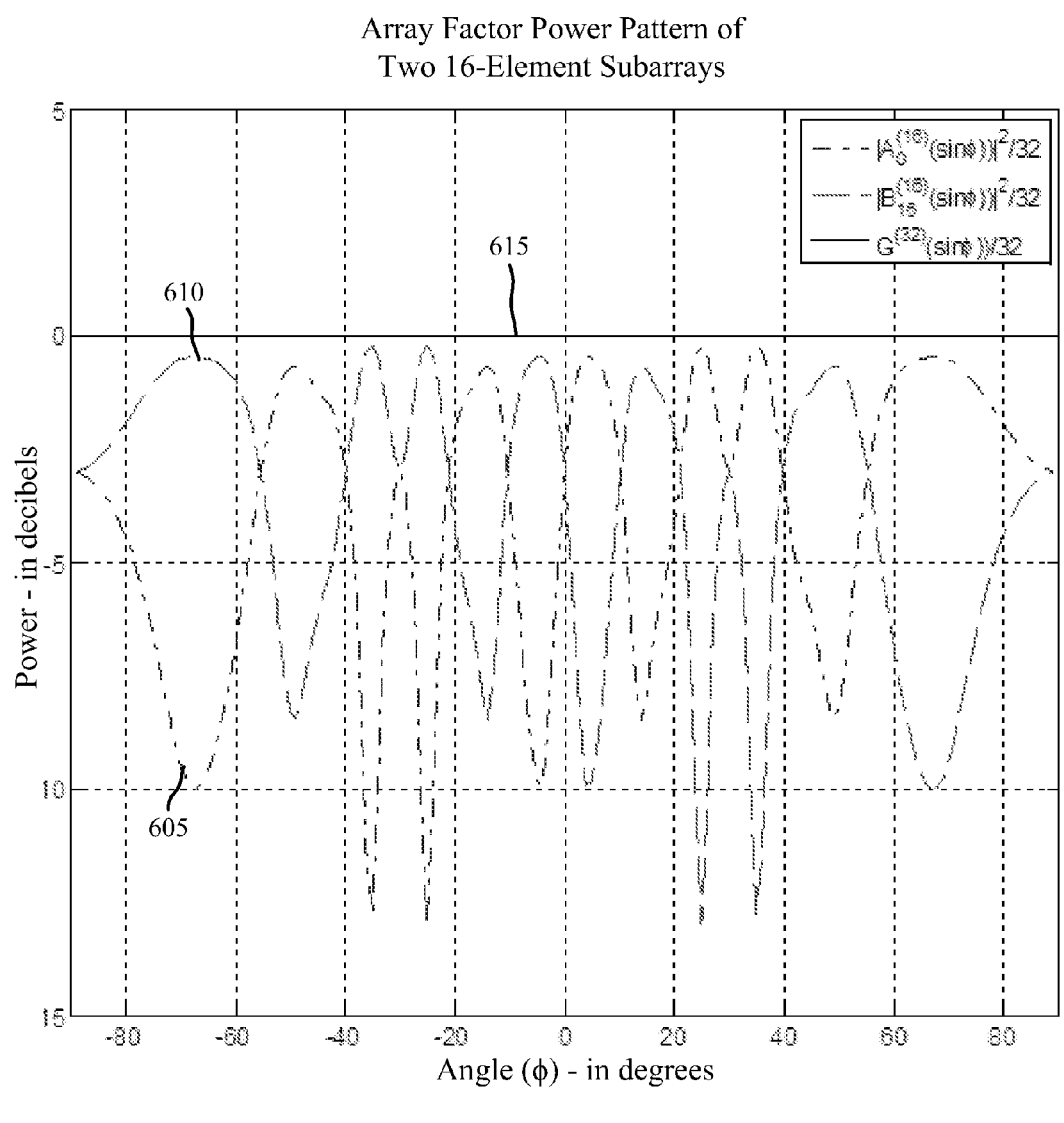
FIG. 6 is a graph of an example of the array factor power pattern of two 16-element subarrays.

Turning next to FIG. 6, a graph 600 is illustrated depicting an example array factor power pattern of an array antenna with two 16-element subarrays transmitting with beamforming weights selected according to the recursive relation described above. The graph 600 depicts a first array factor power pattern 605 of a 16-element subarray comprising array elements 0-15, which is determined according to the expression:

$$|A_0^{(16)}(\sin(\phi))|^2/32 \qquad (25)$$

This may be an example of an array factor power pattern of the first subarray 315 from FIGS. 3 and 4. The graph 600 also depicts a second array factor power pattern 610 of a 16-element subarray comprising array elements 16-31, which is determined according to the expression:

$$|B_{16}^{(16)}(\sin(\phi))|^2/32 \qquad (26)$$

This may be an example of an array factor power pattern of the second subarray 320 from FIGS. 3-4. The graph 600 also depicts the sum of the array factor power pattern 615 which is determined according to the expression:

$$G^{(32)}(\sin(\phi))/32 \qquad (27)$$

The horizontal axis of the graph 600 represents the angle φ (in degrees), while the vertical axis represents power (in decibels). The sum of the array factor power pattern 615 may be constant over the range {−90°<φ<90°}.

Figure 7:
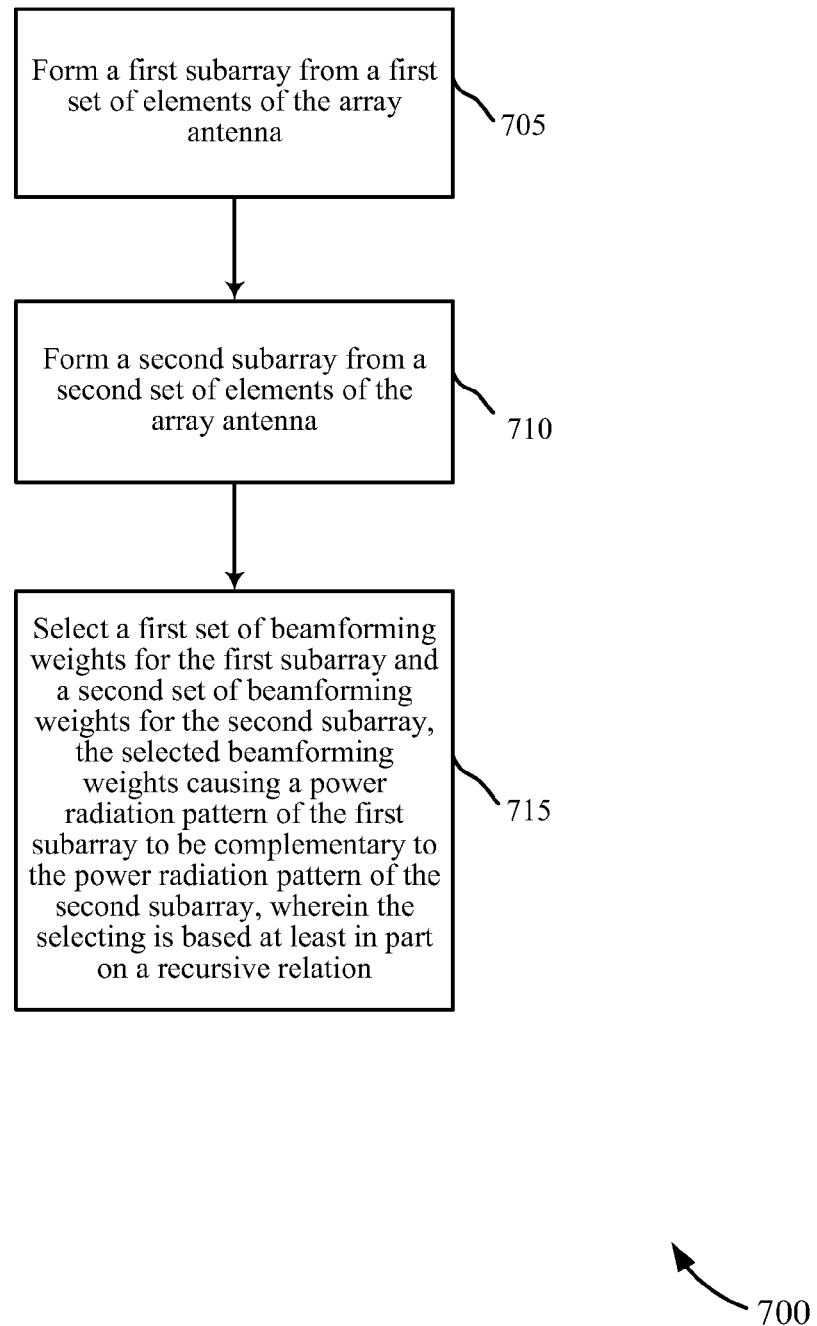
FIG. 7 is a flowchart of a method for transmitting using the beamformer of an antenna array.

Turning next to FIG. 7, a flow chart is illustrated depicting a method 700 for transmitting data using an array antenna in a wireless communications system in accordance with various aspects of the present disclosure. For clarity, the method 700 is described below with reference to aspects of the base station 105 of FIGS. 1-3 and 5. In particular, method 700 may be performed by the beamforming module 210 of FIGS. 2-3. In some embodiments a base station 105 or other apparatus may execute one or more sets of codes to control the functional elements described below.

At block 705, the subarray forming module 305 may form a first subarray 315 from a first set of elements of an array antenna located in the transmitting module 215. The first subarray 315 may be formed from the first half of the elements of the array antenna, which may be located in the transmitting module 215. The first subarray 315 may also be formed from other configurations of array elements, such as every other element or all of the elements.

At block 710, the subarray forming module 305 may form a second subarray 320 from a second set of elements of an array antenna located in the transmitting module 215. The second subarray 320 may be formed from the remaining elements of an array antenna after the first subarray 315 is formed, or it may include some or all of the same elements as the first subarray 315.

At block 715, the beamforming weight selection module 310 may select a first set of beamforming weights for the first subarray 315 and a second set of beamforming weights may be selected for the second subarray 320, the selected beamforming weights causing a power radiation pattern of the first subarray 315 to be complementary to the power radiation pattern of the second subarray 320. In one embodiment, the selection of the weights may be based at least in part on a recursive relation.

Thus, the method 700 may provide for the transmission of data using an array antenna in a wireless communications system. It should be noted that the method 700 is just one implementation and that the operations of the method 700 may be rearranged or otherwise modified such that other implementations are possible.

Figure 8:
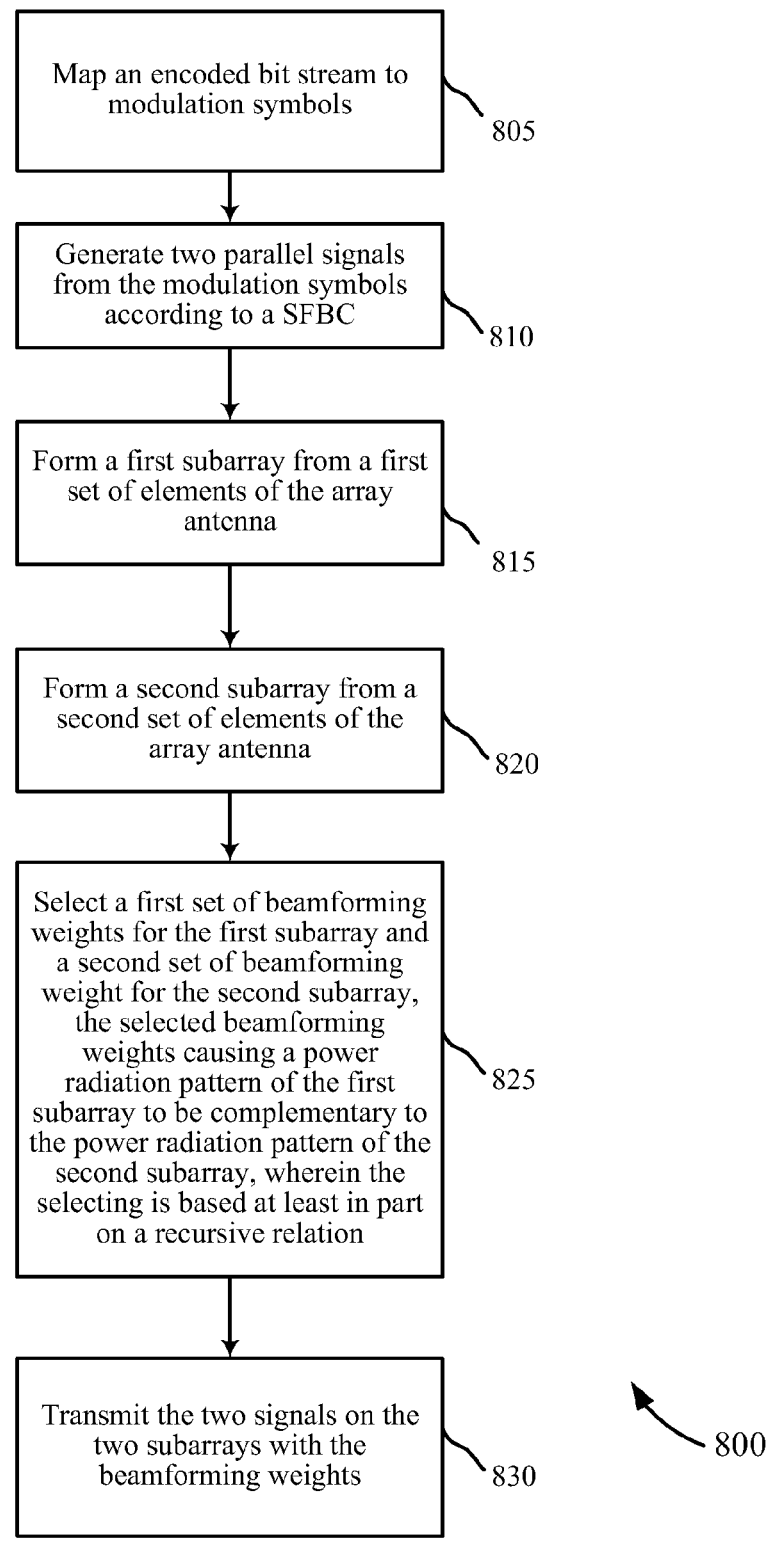
FIG. 8 is a flowchart of a method for transmitting using the beamformer of an antenna array implementing an Alamouti code.

Turning next to FIG. 8, a flow chart is illustrated depicting a method 800 for transmitting data using an array antenna in a wireless communications system in accordance with various aspects of the present disclosure. For clarity, the method 800 is described below with reference to aspects of the base station 105 of FIGS. 1-3 and 5. In some embodiments a base station 105 or other apparatus may execute one or more sets of codes to control the functional elements described below.

At block 805, the signal generation module 205 may map an encoded bit stream to modulation symbols such as phase shift keying (PSK) or quadrature amplitude modulation (QAM) symbols.

At block 810, the signal generation module 205 may generate two parallel signals from the modulation symbols according to a SFBC, which may be based in part on an Alamouti code.

At block 815, the subarray forming module 305 may form a first subarray 315 from a first set of elements of an array antenna located in the transmitting module 215. The first subarray 315 may be formed from the first half of the elements of the subarray antenna, which may be located in the transmitting module 215. The first subarray 315 may also be formed from other configurations of array elements, such as every other element or all of the elements.

At block 820, the subarray forming module 305 may form a second subarray 320 from a second set of elements of an array antenna located in the transmitting module 215. The second subarray 320 may be formed from the remaining elements of an array antenna after the first subarray 315 is formed, or it may include some or all of the same elements as the first subarray 315.

At block 825, the beamforming weight selection module 310 may select a first set of beamforming weights for the first subarray 315 and a second set of beamforming weights may be selected for the second subarray 320. The selected beamforming weights may cause a power radiation pattern of the first subarray 315 to be complementary to the power radiation pattern of the second subarray 320. The weights may be selected based at least in part on a recursive relation.

At block 830, the transmitting module 215 may transmit the two signals on the two subarrays with the beamforming weights.

Thus, the method 800 may provide for the transmission of data using an array antenna in a wireless communications system. It should be noted that the method 800 is just one implementation and that the operations of the method 800 may be rearranged or otherwise modified such that other implementations are possible.

Figure 9:
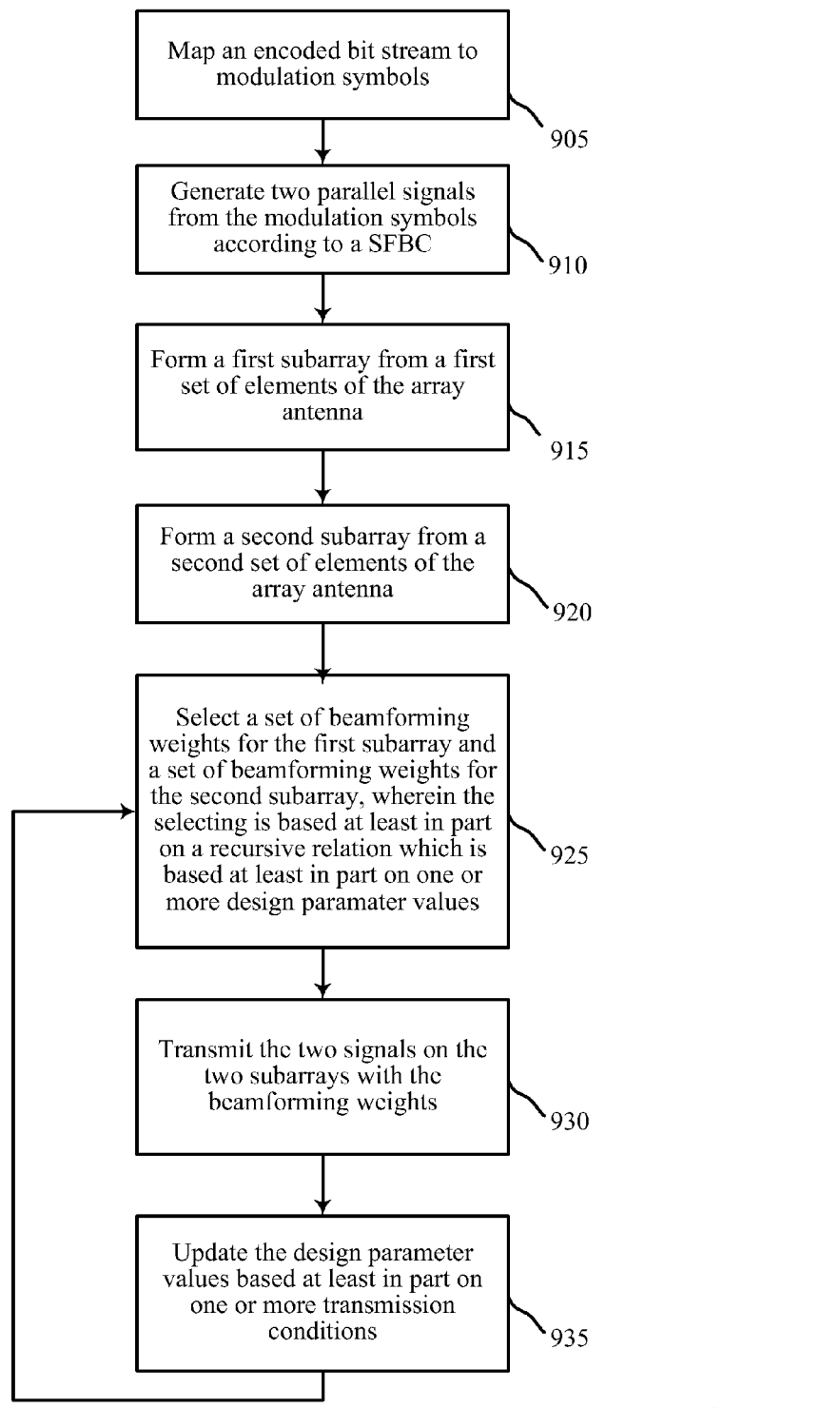
FIG. 9 is a flowchart of a method for transmitting using the beamformer of an antenna array that is updated based on design parameters.

Turning next to FIG. 9, a flow chart is illustrated depicting a method 900 for transmitting data using an array antenna in a wireless communications system in accordance with various aspects of the present disclosure. For clarity, the method 900 is described below with reference to aspects of the base station 105 of FIGS. 1-3 and 5. In some embodiments a base station 105 or other apparatus may execute one or more sets of codes to control the functional elements described below.

At block 905, the signal generation module 205 may map an encoded bit stream to modulation symbols such as phase shift keying (PSK) or quadrature amplitude modulation (QAM) symbols.

At block 910, the signal generation module 205 may generate two parallel signals from the modulation symbols according to a SFBC, which may be based in part on an Alamouti code.

At block 915, the subarray forming module 305 may form a first subarray 315 from a first set of elements of an array antenna located in the transmitting module 215. The first subarray 315 may be formed from the first half of the elements of the array antenna, which may be located in the transmitting module 215. The first subarray 315 may also be formed from other configurations of array elements, such as every other element or all of the elements.

At block 920, the subarray forming module 305 may form a second subarray 320 from a second set of elements of an array antenna located in the transmitting module 215. The second subarray 320 may be formed from the remaining elements of an array antenna after the first subarray 315 is formed, or it may include some or all of the same elements as the first subarray 315.

At block 925, the beamforming weight selection module 310 may select a first set of beamforming weights for the first subarray 315 and a second set of beamforming weights may be selected for the second subarray 320. In one example, the beamforming weights may be selected in order to cause a power radiation pattern of the first subarray 315 to be complementary to the power radiation pattern of the second subarray 320. A recursive relation may be used to select these beamforming weights.

At block 930, the transmitting module 215 may transmit the two signals on the two subarrays with the beamforming weights.

At block 935, the design parameter update module 530 may update at least one design parameter value based at least in part on one or more transmission conditions. After the design parameter values are updated, the beamforming weight selection module 310 may update the beamforming weights based at least in part on the updated design parameter values. This is depicted in method 900 by an arrow leading from block 935 back to block 925. Thus, the design parameter update module 530 may be a means for updating the first set of beamforming weights for the first subarray 315 and the second set of beamforming weights for the second subarray. The updating of the weights may be based at least in part on an update of the at least one design parameter value.

Thus, the method 900 may provide for the transmission of data using an array antenna in a wireless communications system. It should be noted that the method 900 is just one implementation and that the operations of the method 900 may be rearranged or otherwise modified such that other implementations are possible.

Figure 10:
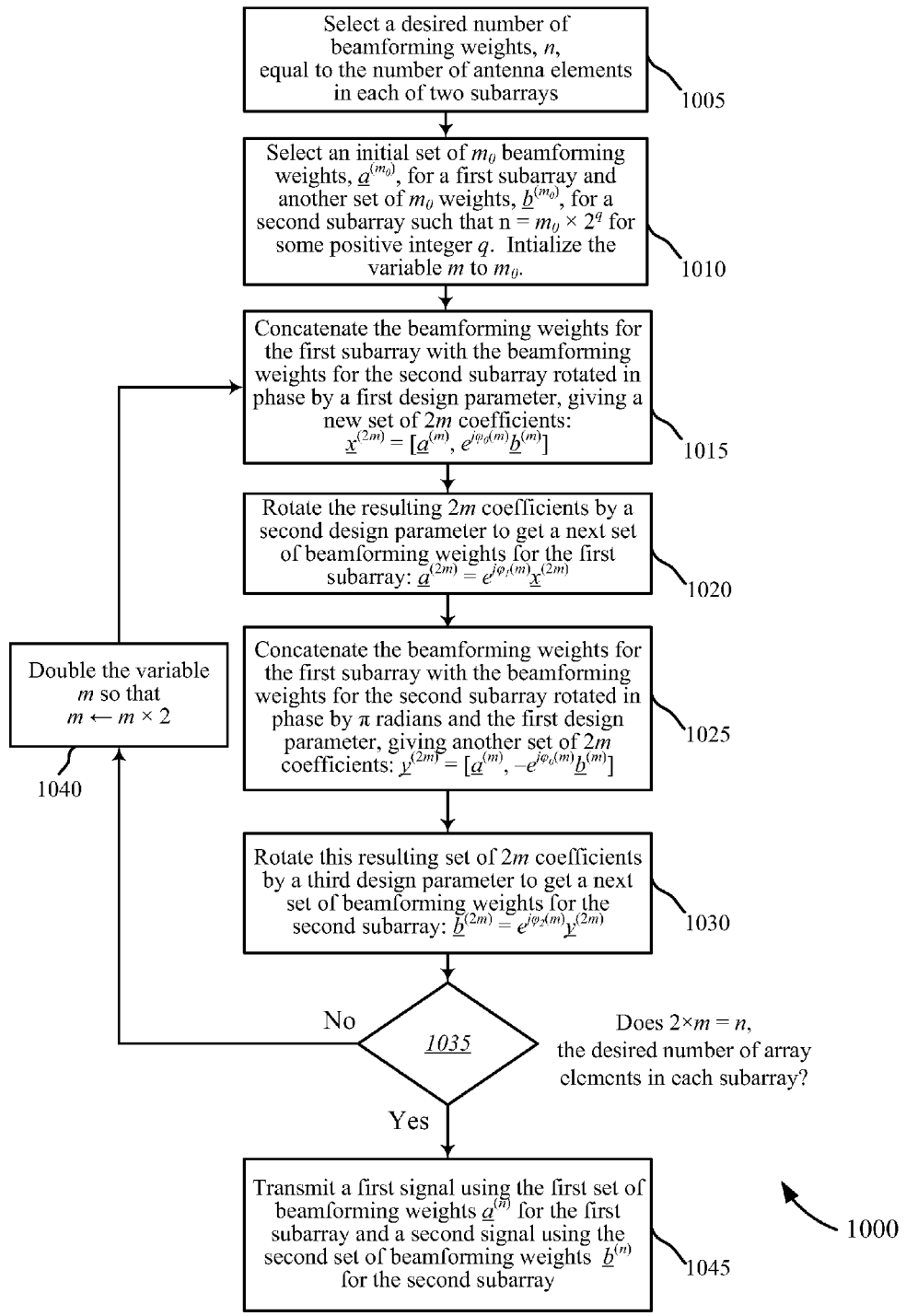
FIG. 10 is a flowchart of a method for transmitting using the beamformer of an antenna array according to some embodiments.

Turning next to FIG. 10, a flow chart is illustrated depicting a method 1000 for selecting beamforming weights for two subarrays such that the sum of the array factor power patterns is constant over a range of an azimuth angle of a cell. For clarity, the method 1000 is described below with reference to aspects of the base station 105 of FIGS. 1-3 and 5. In particular, some steps of method 1000 may be performed by the beamforming module 210 of FIGS. 2-3. In some embodiments a base station 105 or other apparatus may execute one or more sets of codes to control the functional elements described below.

At block 1005, the beamforming weight selection module 310 may select a desired number of beamforming weights, n, equal to the number of antenna elements 410 in each of two subarrays.

At block 1010, the beamforming weight selection module 310 may select an initial set of $m_0$ beamforming weights, $\underline{a}^{(m_0)}$, for a first subarray 315 and another set of $m_0$ weights, $\underline{b}^{(m_0)}$, for a second subarray 320, such that $n=m_0\times 2^q$ for some positive integer q. The beamforming weight selection module 310 initializes the variable m to $m_0$. The initial weights may be set to 1 as described in the example above, or they may be different from 1.

At block 1015, the beamforming weight selection module 310 may concatenate the beamforming weights, $\underline{a}^{(m)}$, for the first subarray 315 with the beamforming weights, $\underline{b}^{(m)}$, for the second subarray 320 rotated in phase by a first design parameter, $\phi_0^{(m)}$, giving a new set of 2m coefficients:

$$\underline{x}^{(2m)} = [\underline{a}^{(m)}, e^{j\phi_0^{(m)}}\underline{b}^{(m)}] \qquad (28)$$

At block 1020, the beamforming weight selection module 310 may rotate the resulting 2m coefficients by a second design parameter, $\phi_1^{(m)}$, to get a next set of beamforming weights for the first subarray 315:

$$\underline{a}^{(2m)} = e^{j\phi_1^{(m)}}\underline{x}^{(2m)} \qquad (29)$$

At block 1025, the beamforming weight selection module 310 may concatenate the beamforming weights, $\underline{a}^{(m)}$, for the first subarray 315 with the beamforming weights, $\underline{b}^{(m)}$, for the second subarray 320 rotated in phase by $\pi$ radians and the first design parameter, $\phi_0^{(m)}$, giving another set of 2m coefficients:

$$\underline{y}^{(2m)} = [\underline{a}^{(m)}, -e^{j\phi_0^{(m)}}\underline{b}^{(m)}] \qquad (30)$$

At block 1030, the beamforming weight selection module 310 may rotate this resulting set of 2m coefficients by a third design parameter, $\phi_2^{(m)}$, to get a next set of beamforming weights for the second subarray 320:

$$\underline{b}^{(2m)} = e^{j\phi_2^{(m)}}\underline{y}^{(2m)} \qquad (31)$$

At block 1035, the beamforming weight selection module 310 may determine whether the 2m equals n, the desired number of array elements 410 in the first subarray 315 and in the second subarray 320.

At block 1040, in the case that 2m is still less than n, the beamforming weight selection module 310 doubles the variable m, i.e. m←2×m.

At block 1045, in the case that 2m=n, the number of beamforming weights, for the first subarray 315 and the number of beamforming weights for the second subarray 320 will be equal to the desired number of antenna elements 410 in the respective subarrays. Then transmitting module 215 may then transmit a first signal using the first set of beamforming weights $\underline{a}^{(n)}$ for the first subarray 315 and a second signal using the second set of beamforming weights $\underline{b}^{(n)}$ for the second subarray 320 so that the resulting sum of power radiation patterns is constant over a range of an azimuth angle of the cell.

Thus, the method 1000 may provide for selection of beamforming weights for two subarrays so that the sum of their array factor power patterns is constant over a range of an azimuth angle of a cell. It should be noted that the method 1000 is just one implementation and that the operations of the method 1000 may be rearranged or otherwise modified such that other implementations are possible.

Techniques described herein may be used for various wireless communications systems such as a next-generation Air-Ground system. It may also be used for CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for transmitting data over an angular range of an array antenna in a wireless communications system, comprising:
   generating two parallel signals, each of the parallel signals associated with the data;
   forming a first subarray from a first set of array elements of an array antenna;
   forming a second subarray from a second set of array elements of the array antenna;
   selecting a first set of beamforming weights for the first subarray and a second set of beamforming weights for the second subarray, the selected beamforming weights causing a power radiation pattern of the first subarray to be complementary to a power radiation pattern of the second subarray over the angular range of the array antenna, wherein the selected beamforming weights are based at least in part on a recursive relation that includes an iterative calculation that increases a calculated number of beamforming weights from an initial set of beamforming weights to a desired number of beamforming weights, the desired number of beamforming weights being equal to a number of elements in the respective subarray;

transmitting, according to the first set of beamforming weights, a first of the parallel signals over the angular range of the array antenna via the first subarray; and transmitting, according to the second set of beamforming weights, a second of the parallel signals over the angular range of the array antenna via the second subarray.

2. The method of claim 1, wherein each repetition of the iterative calculation begins with an initial number of beamforming weights and calculates twice the initial number of beamforming weights.

3. The method of claim 1, wherein the data comprises a control channel.

4. The method of claim 1, wherein generating the two parallel signals is based at least in part on a space frequency block code (SFBC), the SFBC based at least in part on an Alamouti code.

5. The method of claim 1, wherein a sum of the power radiation pattern of the first subarray and the power radiation pattern of the second subarray is constant over the angular range of the array antenna.

6. The method of claim 1, wherein the first set of array elements and the second set of array elements comprise a same element pattern.

7. The method of claim 1, wherein at least one array element of the first subarray or the second subarray is omnidirectional over the angular range of the array antenna.

8. The method of claim 1, wherein the array antenna is a uniform linear array antenna.

9. The method of claim 1, wherein the recursive relation is based at least in part on at least one design parameter value.

10. The method of claim 9, wherein the at least one design parameter value is based at least in part one or more transmission conditions.

11. The method of claim 9, further comprising:
updating the first set of beamforming weights for the first subarray and the second set of beamforming weights for the second subarray, wherein the updating is based at least in part on an update of the at least one design parameter value.

12. An apparatus for transmitting data over an angular range of an array antenna in a wireless communications system, comprising:
means for generating two parallel signals, each of the parallel signals associated with the data;
means for forming a first subarray from a first set of array elements of an array antenna;
means for forming a second subarray from a second set of array elements of the array antenna;
means for selecting a first set of beamforming weights for the first subarray and a second set of beamforming weights for the second subarray, the selected beamforming weights causing a power radiation pattern of the first subarray to be complementary to a power radiation pattern of the second subarray over the angular range of the array antenna, wherein the selected beamforming weights are based at least in part on a recursive relation that includes an iterative calculation that increases a calculated number of beamforming weights from an initial set of beamforming weights to a desired number of beamforming weights, the desired number of beamforming weights being equal to a number of elements in the respective subarray means for transmitting, according to the first set of beamforming weights, a first of the parallel signals over the angular range of the array antenna via the first subarray; and means for transmitting, according to the second set of beamforming weights, a second of the parallel signals over the angular range of the array antenna via the second subarray.

13. The apparatus of claim 12 wherein the data comprises a control channel.

14. The apparatus of claim 12, wherein the means for generating the two parallel signals is operable based at least in part on a space frequency block code (SFBC), the SFBC based at least in part on an Alamouti code.

15. The apparatus of claim 12, wherein a sum of the power radiation pattern of the first subarray and the power radiation pattern of the second subarray is constant over the angular range of the array antenna.

16. The apparatus of claim 12, wherein the first set of array elements and the second set of array elements comprise a same element pattern.

17. The apparatus of claim 12, wherein the array antenna is a uniform linear array antenna.

18. The apparatus of claim 12, wherein the recursive relation is based at least in part on at least one design parameter value.

19. The apparatus of claim 18, wherein the at least one design parameter value is based at least in part one or more transmission conditions.

20. The apparatus of claim 18, further comprising:
means for updating the first set of beamforming weights for the first subarray and the second set of beamforming weights for the second subarray, wherein the updating is based at least in part on an update of the at least one design parameter value.

21. An apparatus for transmitting data over an angular range of an array antenna in a wireless communications system, comprising:
a processor;
memory in electronic communication with the processor; and
instructions stored in the memory, the instructions being executable by the processor to:
generate two parallel signals, each of the parallel signals associated with the data;
form a first subarray from a first set of array elements of an array antenna;
form a second subarray from a second set of array elements of the array antenna;
select a first set of beamforming weights for the first subarray and a second set of beamforming weights for the second subarray, the selected beamforming weights causing a power radiation pattern of the first subarray to be complementary to a power radiation pattern of the second subarray over the angular range of the array antenna, wherein the selected beamforming weights are based at least in part on a recursive relation that includes an iterative calculation that increases a calculated number of beamforming weights from an initial set of beamforming weights to a desired number of beamforming weights, the desired number of beamforming weights being equal to a number of elements in the respective subarray transmit, according to the first set of beamforming weights, a first of the parallel signals over the angular range of the array antenna via the first subarray; and transmit, according to the second set of beamforming weights, a second of the parallel signals over the angular range of the array antenna via the second subarray.

22. The apparatus of claim 21, wherein the instructions are executable by the processor to:

generate the two parallel signals based at least in part on a space frequency block code (SFBC), the SFBC based at least in part on an Alamouti code.

23. The apparatus of claim 21, wherein the recursive relation is based at least in part at least one design parameter value.

24. The apparatus of claim 23, wherein the at least one design parameter value is based at least in part one or more transmission conditions.

25. The apparatus of claim 23, wherein the instructions are executable by the processor to:

update the first set of beamforming weights for the first subarray and the second set of beamforming weights for the second subarray, wherein the updating is based at least in part on an update of the at least one design parameter value.

26. A computer program product for transmitting data over an angular range of an array antenna in a wireless communications system, the computer program product comprising a non-transitory computer-readable medium storing instructions executable by a processor to:

generate two parallel signals, each of the parallel signals associated with the data;

form a first subarray from a first set of array elements of an array antenna;

form a second subarray from a second set of array elements of the array antenna;

select a first set of beamforming weights for the first subarray and a second set of beamforming weights for the second subarray, the selected beamforming weights causing a power radiation pattern of the first subarray to be complementary to a power radiation pattern of the second subarray over the angular range of the array antenna, wherein the selected beamforming weights are based at least in part on a recursive relation that includes an iterative calculation that increases a calculated number of beamforming weights from an initial set of beamforming weights to a desired number of beamforming weights, the desired number of beamforming weights being equal to a number of elements in the respective subarray transmit, according to the first set of beamforming weights, a first of the parallel signals over the angular range of the array antenna via the first subarray; and transmit, according to the second set of beamforming weights, a second of the parallel signals over the angular range of the array antenna via the second subarray.

27. The computer program product of claim 26, wherein the instructions are executable by the processor to:

generate the two parallel signals based at least in part on a space frequency block code (SFBC), the SFBC based at least in part on an Alamouti code.

28. The computer program product of claim 26, wherein the recursive relation is based at least in part on at least one design parameter value.

29. The computer program product of claim 28, wherein the at least one design parameter value is based at least in part one or more transmission conditions.

30. The computer program product of claim 28, wherein the instructions are executable by the processor to:

update the first set of beamforming weights for the first subarray and the second set of beamforming weights for the second subarray, wherein the updating is based at least in part on an update of the at least one design parameter value.

* * * * *